(12) United States Patent
Hofmann et al.

(10) Patent No.: US 11,188,299 B2
(45) Date of Patent: Nov. 30, 2021

(54) REPURPOSED HEXADECIMAL FLOATING POINT DATA PATH

(71) Applicant: International Business Machines Corporation, Armonk, NY (US)

(72) Inventors: Nicol Hofmann, Leinfelden-Echterdingen (DE); Michael Klein, Schoenaich (DE); Petra Leber, Ehningen (DE); Kerstin Claudia Schelm, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 16/527,138

(22) Filed: Jul. 31, 2019

(65) Prior Publication Data

US 2021/0034325 A1 Feb. 4, 2021

(51) Int. Cl.
*G06F 5/01* (2006.01)
*G06F 7/499* (2006.01)
*G06F 7/48* (2006.01)

(52) U.S. Cl.
CPC ............ *G06F 5/012* (2013.01); *G06F 7/4824* (2013.01); *G06F 7/49947* (2013.01); *G06F 2207/3844* (2013.01)

(58) Field of Classification Search
CPC ............. G06F 2207/3844; G06F 5/012; G06F 7/49936; G06F 7/49947
See application file for complete search history.

(56) References Cited

U.S. PATENT DOCUMENTS

| 5,687,106 | A | * | 11/1997 | Schwarz | ............... | G06F 7/483 |
| | | | | | | 708/204 |
| 6,021,422 | A | * | 2/2000 | Schwarz | ............... | G06F 7/4876 |
| | | | | | | 708/503 |
| 9,785,433 | B2 | | 10/2017 | Espasa et al. | | |
| 10,078,512 | B2 | | 9/2018 | Elmer | | |
| 2004/0230774 | A1 | * | 11/2004 | Schwarz | ............... | G06F 9/3802 |
| | | | | | | 712/222 |
| 2016/0085509 | A1 | * | 3/2016 | Mueller | ............... | G06F 7/4876 |
| | | | | | | 708/501 |
| 2016/0283231 | A1 | * | 9/2016 | Schwarz | ............... | G06F 9/3001 |

OTHER PUBLICATIONS

G. Gerwig et al., "The IBM eServer z990 floating-point unit," in IBM Journal of Research and Development, vol. 48, No. 3/4, pp. 311-322, May 2004 (Year: 2004).*

(Continued)

*Primary Examiner* — Matthew D Sandifer
(74) *Attorney, Agent, or Firm* — Cantor Colburn LLP; Steven Chiu

(57) ABSTRACT

A method includes dividing a fraction of a floating point result into a first portion and a second portion. The method includes outputting a first normalizer result based on the first portion during to a first clock cycle. The method includes storing a first segment of the first portion during to the first clock cycle. The method includes outputting a first rounder result based on the first normalizer result during to the first clock cycle. The method includes outputting a second normalizer result based on the second portion during to a second clock cycle. The method includes outputting a second rounder result based on the second normalizer result and the first segment during to the second clock cycle.

8 Claims, 2 Drawing Sheets

(56) References Cited

OTHER PUBLICATIONS

S. D. Trong, M. Schmookler, E. M. Schwarz and M. Kroener, "P6 Binary Floating-Point Unit," 18th IEEE Symposium on Computer Arithmetic (ARITH '07), pp. 77-86, 2007 (Year: 2007).*

Preprints. Fang, L. et al. A Unified Reconfigurable CORDIC Processor for Floating-Point Arithmetic. Jun. 25, 2018 (doi:10.20944/preprints201806.0393.v1). 12 Pages.

IEEE Computer Society. Lichtenau, Cedric & Carlough, S & Mueller, Silvia. Quad Precision Floating Point on the IBM z13. 2016 IEEE 23nd Symposium on computer Arithmetic. DOI 10.1109/ARITH.2016.26. pp. 87-94.

Transmittal Form PTO/SB/21, filed Mar. 19, 2020.

* cited by examiner

REPURPOSED HEXADECIMAL FLOATING POINT DATA PATH

BACKGROUND

The present invention relates to a repurposed hexadecimal floating point data path, and more specifically, to use of the hexadecimal data bus with different floating point number formats.

SUMMARY

Embodiments may include methods, systems, and circuitry for hexadecimal extended precision data buses. A method includes dividing a fraction of a floating point result into a first portion and a second portion. The method includes outputting a first normalizer result based on the first portion during to a first clock cycle. The method includes storing a first segment of the first portion during to the first clock cycle. The method includes outputting a first rounder result based on the first normalizer result during to the first clock cycle. The method includes outputting a second normalizer result based on the second portion during to a second clock cycle. The method includes outputting a second rounder result based on the second normalizer result and the first segment during to the second clock cycle.

A floating point unit includes hexadecimal floating point normalizer circuitry including a result register sized to output a normalized hexadecimal result that includes a first segment and a second segment. The floating point unit includes latch circuitry having a bit width sized to retain the first segment of the normalized hexadecimal result as buffered data. The floating point unit includes hexadecimal floating point rounder circuitry having an input register bit width sized to receive the first segment and the second segment from the hexadecimal floating point normalizer circuitry and the buffered data from the latch circuitry.

A floating point unit includes hexadecimal floating point normalizer circuitry. The hexadecimal floating point normalizer circuitry includes an input register sized to receive a first portion of a fraction portion of a floating point number and a second portion of the fraction portion of the floating point number. The hexadecimal floating point normalizer circuitry includes a result register sized to output a normalized hexadecimal result that includes a first segment and a second segment, the output based on the fraction portion. The floating point unit includes latch circuitry having a bit width sized to retain the first segment associated with the first portion of the normalized hexadecimal result as buffered data. The floating point unit includes hexadecimal floating point rounder circuitry. The hexadecimal floating point rounder circuitry includes an input register bit width sized to receive the first segment and the second segment associated with the second portion of the normalized hexadecimal result from the hexadecimal floating point normalizer circuitry, and the buffered data from the latch circuitry.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
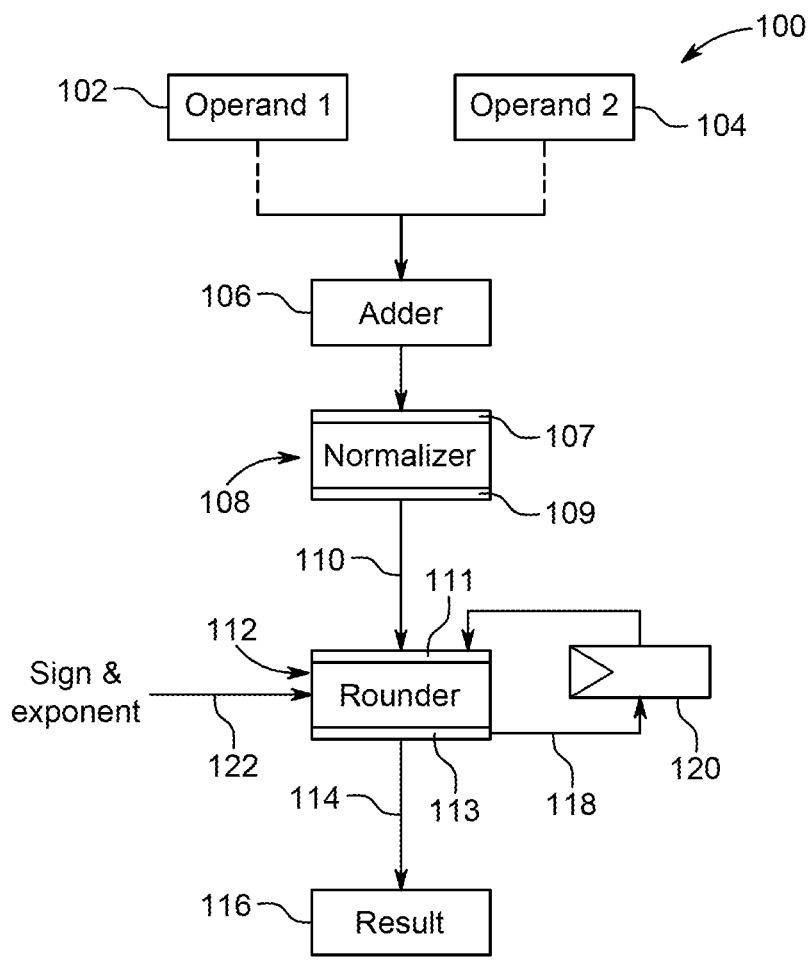
FIG. 1 illustrates a block diagram of portions of a floating point unit having circuitry in accordance with one or more embodiments of the present invention.

Floating point numbers are defined by various formats. Floating point execution units are often repurposed to perform operations on particular floating point number formats. As the precision of floating point numbers is increased, additional clock cycles may be used to complete operations. The additional clock cycles typically underutilize existing data paths associated with the respective floating point number formats and aggravate critical path execution processing time. Floating point execution units associated with different floating point formats may be repurposed to process such increased precision formats that may reduce the clock cycles, power, and/or hardware required.

A critical path includes a group of functional operations and clock cycle requirements to obtain a desired result. Each functional operation on the critical path often increases the processing time for an operation or process to complete. Precision for floating point units relates to the amount of detail encapsulated in the binary number. For example, precision thresholds may include single precision (32 bits), double precision (64 bits), quadruple precision (128 bits) or any other number of associated bits. Normalization of floating point numbers arranges the fractional portion of the number to remove the leading zeros of the floating point format and adjusts the exponent accordingly. Floating point numbers with increased precision or precision greater than the normalizer bus bit width typically require additional normalization cycles to properly normalize the extended precision number. For example, a double precision number may be normalized on a single precision normalizer. As such, additional clock cycles may be required for a residue check to be completed. A quadruple precision number may be normalized on a single or double precision normalizer. The floating point number may be a binary floating point number or a hexadecimal floating point number.

Embodiments described herein provide operations of a floating point unit. It should be appreciated that any arithmetic unit, floating point or otherwise, may implement teachings described herein or portions thereof. Circuitry refers to any combination of logic, wires, fundamental components, transistors, diodes, latches, switches, flip-flops, or other implements, that may be arranged to carry the intended output or disclosed operations. It should be appreciated that the term register may not refer to memory retention and merely include data or signal passthrough.

A rounder or rounder circuitry may receive normalizer output and properly define the receive floating point number to the correct number of significant digits or otherwise.

Extended precision operations may perform rounding in multiple clock cycles. That is, the floating point unit may be operated according to a clock or pulse indication, directing the floating point unit to process the next set of information. The clock is typically defined by any oscillator or oscillating signal. As such, portions of the floating point number fraction are often processed by the rounder circuitry according to discrete clock cycles to provide rounding result output from the floating point unit. Result registers may be preconfigured to receive rounder circuitry output in the form of predetermined portions of the floating point number. Clock-based operations may be performed according to any number of clock cycles performed consecutively or intermittently.

Referring to FIG. 1, a floating point unit 100 is shown in accordance with one or more embodiments of the present invention. Floating point unit 100 receives a first operand 102 and a second operand 104. The floating point unit 100 may include an adder 106 or circuitry to perform another arithmetic operation on the first operand 102 and the second operand 104. It should be appreciated that any number of arithmetic operations may be performed on the first operand 102 and the second operand 104. Any number of additional operands may further be used. The hexadecimal floating point normalizer circuitry 108 shown in FIG. 1 normalizes a decimal position associated with the floating point number received from adder 106.

The hexadecimal normalizer circuitry 108 may be a double precision hexadecimal floating point normalizer or a hexadecimal floating point normalizer circuitry and include an input register 107 and a result register 109. The normalized hexadecimal result register 109 is sized to output a hexadecimal result. For extended floating point numbers such as quadruple precision numbers, the hexadecimal normalizer circuitry 108 shown in FIG. 1 outputs a normalized fraction portion of the quadruple precision number in accordance with one or more embodiments of the present invention. The result register 109 is sized to output a normalized hexadecimal result, where the normalized hexadecimal result is the fraction portion of a floating point number or a portion of the fraction portion. As an example, during a first clock cycle the result register 109 outputs a first portion of the fraction portion of the floating point number normalized by the hexadecimal floating point normalizer circuitry 108 in accordance with one or more embodiments. The result register 109 may output to a bus 110 having a bit width of 57 bits for the typical 56-bit hexadecimal fraction plus a leading zero too large bit. The 56-bit hexadecimal fraction may be split into a first segment and a second segment. The first segment may be an 8-bit segment and the second segment may be a 49-bit segment. The bus 110 connects the result register 109 of the hexadecimal floating point normalizer circuitry 108 to the hexadecimal floating point rounder circuitry 112 input register 111. Input register 111 has a bit width, or accepted amount of bits, similar to the bus 110.

The hexadecimal floating point rounder circuitry 112 may be a double precision hexadecimal floating point rounder that may round the received fraction portion to from bus 110 to the required amount. The hexadecimal floating point rounder circuitry 112 computes the rounded result and outputs to output register 113. The output register 113 is associated with a result bus 114 that provides the hexadecimal floating point rounder circuitry 112 result to result circuitry 116. Result circuitry 116 may be used by a processor or other circuitry to use or display the calculated floating point number. The result circuitry 116 may have predetermined bit width inputs. For example, the result circuitry 116 may anticipate rounder outputs to have a 48-bit width during the first cycle and a 64-bit width during the second cycle. That is, the output register 113 may have a 64-bit width configured to output a 48-bit result and a 64-bit result depending on the clock cycle.

The floating point unit 100 shown in FIG. 1 includes latch circuitry 120 having a bit width sized to retain the first segment of the first portion of the floating point number in accordance with one or more embodiments of the present invention. The first segment may be stored as buffered data or defined as buffered data with registers of the latch circuitry 120. The latch circuitry 120 may include a supply bus 118 having a bit width sized to supply the first segment to the latch circuitry 120. The supply bus 118 may be disposed before or after the hexadecimal floating point rounder circuitry 112. The bit width of the latch circuitry may be eight bits for double precision hexadecimal floating point data paths that are processing quadruple precision floating point numbers. During the first processing cycle the first segment is stored in the latch circuitry 120 and the hexadecimal floating point rounder circuitry 112 provides the rounded second segment associated with the first portion in output register 113. During the second processing cycle the latch circuitry 120 releases the stored first segment as buffered data to the input register 111 of the hexadecimal floating point rounder circuitry 112. The input register 111 of the hexadecimal floating point rounder circuitry 112 receives the second portion of the fraction portion of the floating point number from bus 110 and combines the second portion with the buffered data such that the hexadecimal floating point rounder circuitry 112 outputs the 64-bit second cycle result to the result circuitry 116. As such, through two clock cycles of the floating point unit, the result register 116 first receives the 48-bit fraction rounder result from result bus 114 and then receives the 64-bit rounder result from bus 114.

Figure 2A:
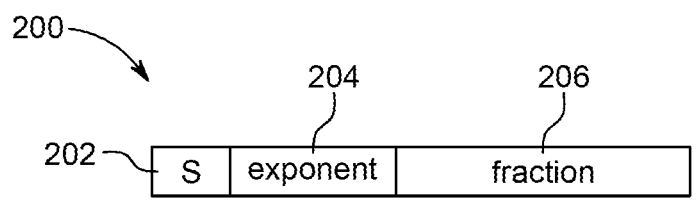
FIG. 2A illustrates a double precision hexadecimal floating point number in accordance with one or more embodiments of the present invention.

Referring to FIG. 2A, a double extended precision hexadecimal floating point number 200 is shown. The double extended precision hexadecimal floating point number 200 includes an extended precision sign bit 202. The double extended precision hexadecimal floating point number 200 includes extended precision hexadecimal exponent bits 204 having a bit width of seven bits. The extended precision hexadecimal precision floating point number 200 includes extended precision hexadecimal fraction bits 206 having a bit width of 56 bits.

Figure 2B:
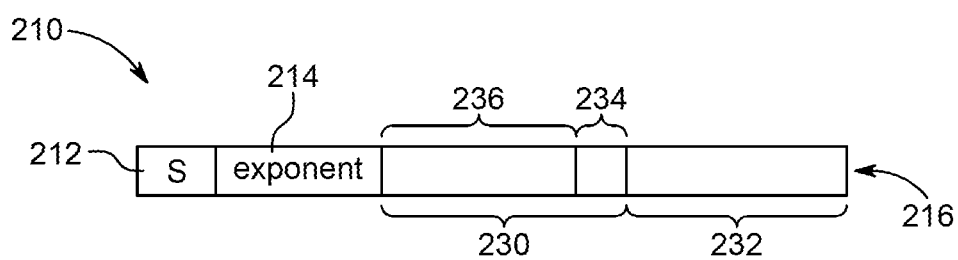
FIG. 2B illustrates an quadruple precision binary floating point number in accordance with one or more embodiments of the present invention.

Referring to FIG. 2B, a quadruple precision floating point number 210 is shown. The quadruple precision floating point number 210 may be a quadruple precision binary floating point number or another binary floating point number. The quadruple precision floating point number 210 includes a quadruple precision sign bit 212. The quadruple precision floating point number 210 includes quadruple precision exponent bits 214 having a bit width of fifteen bits. The quadruple precision floating point number 210 includes 112 quadruple precision fraction bits 216. The fraction portion 216 may include a first portion 230 and a second portion 232. The fraction portion 216 may be split in half to form the first portion 230 and the second portion 232. That is, the first portion 230 may include 56 bits and the second portion 232 may include 56 bits. The first portion 230 may include an additional leading zero too large bit or one bit leading zero too large flag, defining an anticipated leading zero control signal, making the first portion 230 57 bits. The leading zero too large bit may be used as an indication of the hexadecimal normalizer circuitry 108 control instructions used to normalize the floating point number. The second portion 232 may include an additional leading zero too large bit, making the second portion 232 57 bits. As such, the quadruple precision floating point number 210 may be processed by the hexadecimal floating point rounder circuitry 112 in two clock cycles. The first portion 230 defines a first segment 234 and a second segment 236. The first segment 234 is stored in the latch circuitry 120 during a first cycle of the floating point unit 100 in accordance with one or more embodiments of the present invention. The first segment 234 may be eight bits. It should be appreciated that first portion 230, second portion 232, first segment 234, and second segment 236 are designations of bits or bit groupings. The groupings may be in any order, out of order, rearranged, or interchanged.

Figure 3:
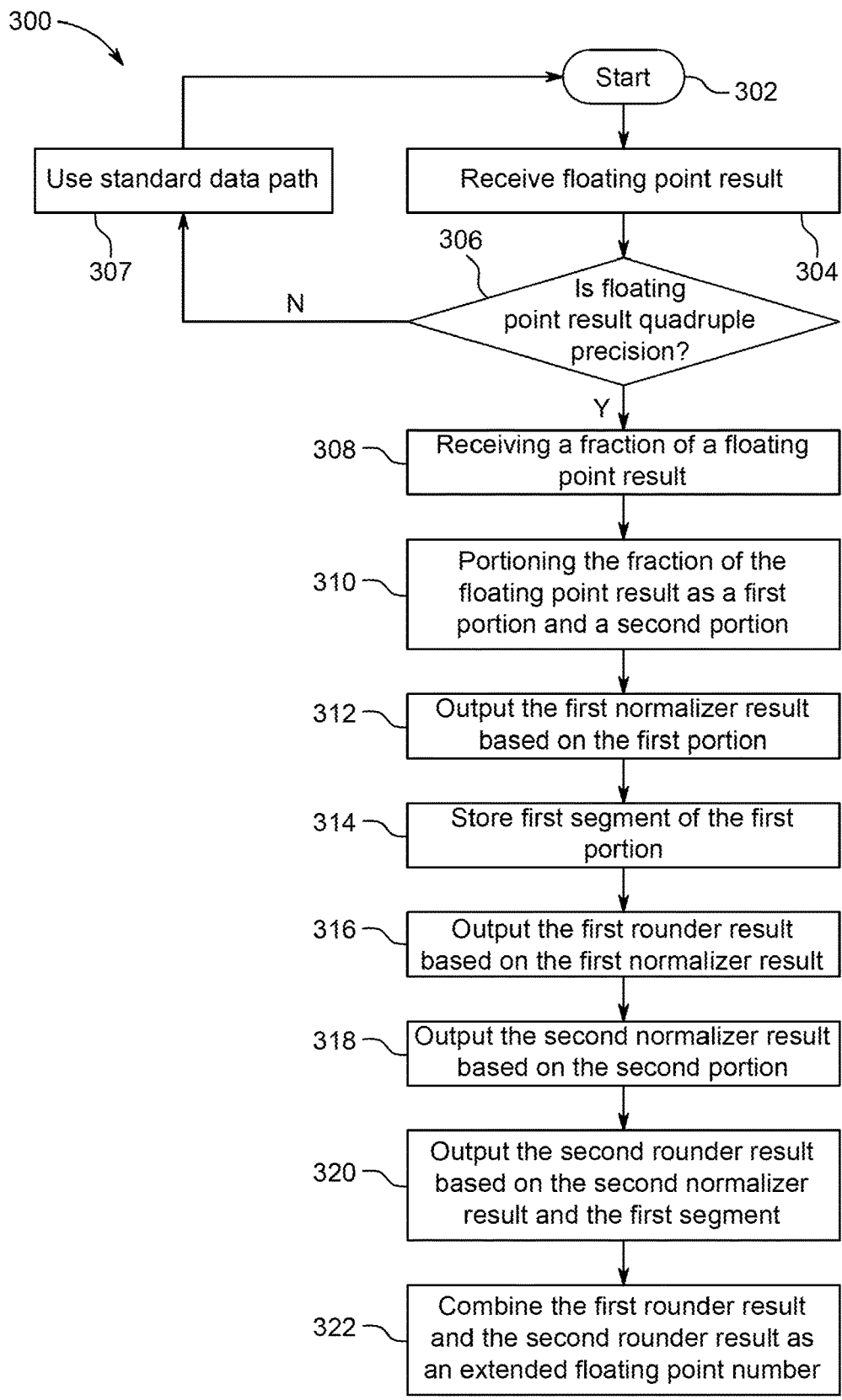
FIG. 3 illustrates a method for using hexadecimal circuitry to process quadruple precision binary floating point numbers in accordance with one or more embodiments of the present invention.

Referring to FIG. 3, a method 300 is shown in accordance with portions of one or more embodiments of the present invention. The method 300 begins in block 302. It should be appreciated that any of the blocks of method 300 may be omitted, repeated, rearranged, and any of the blocks of method 300 may be completed in sequence or in parallel. In block 304, hexadecimal floating point normalizer circuitry 108 of the floating point unit 100 receives a floating point result. In block 306, the floating point result is analyzed to determine whether the floating point result is a hexadecimal floating point number 200 or a binary floating point number 210. If the result is not a hexadecimal floating point number 200, the standard data path for that type may be used in block 307. The floating point result may be analyzed by the hexadecimal normalizer circuitry 108 or another processor and circuitry associated with the floating point unit 100. If the floating point result is a binary floating point number 210, the floating point unit 100 may receive the fraction portion 216 of the floating point number 210 in block 308.

At block 310, the fraction portion 216 is portioned or divided according to a bit width of bus 110. The hexadecimal normalizer circuitry 108 may portion or divide the fraction portion 216 during normalization or the fraction portion 216 may be multiplexed or otherwise divided or portioned with additional circuitry. The bit width of bus 110 may be 57 bits sized as necessary to accommodate the 57 bit fraction portion 206 of hexadecimal floating point numbers 200. As such, the fraction portion 216 may be separated for example into a first portion 230 of 57 bits and a second portion 232 of 57 bits. The hexadecimal floating point normalizer circuitry 108 outputs the normalizer result through result register 109 and bus 110 based on the first portion 230 in block 312. A first segment 234 of the hexadecimal floating point normalizer circuitry 108 result is stored in latch circuitry 120 in block 314. The second segment 236 may be rounded according to hexadecimal floating point rounder circuitry 112 in block 316. The first rounder result may be outputted based on the first normalizer result. That is, the first rounder result (48 bits) based on the second segment 236 of the first portion 230 may be sent to result circuitry 116 during a first clock cycle or according to a first clock cycle of the floating point unit.

In block 318, the second normalizer result is outputted from result register 109 to bus 110. The second normalizer result may be based on the second portion 232. In block 320, the hexadecimal floating point rounder circuitry 112 may output a second rounder result based on the second normalizer result and the buffered data stored in the latch circuitry 120 according to the first segment 234. In block 322, the first rounder result and the second rounder result, based on the first portion 230 and the second portion 232 may be combined to form the quadruple precision floating point number originally desired by the combination of operand 102 and operand 104.

The clock cycles, hardware, and/or power required to normalize and round increased precision floating point numbers by the floating point unit 100 may be reduced while maintaining anticipated hexadecimal floating point rounder circuitry 112 output by storing portions or segments of the floating point number.

It should be appreciated that any number of clock cycles, intermediate or otherwise, may be implemented to provide similar results. The number formats discussed and disclosed may be scaled according to any necessary precision. As an example, the quadruple precision floating point number 210 may be an octuple precision floating point number and the double extended precision hexadecimal floating point number 200 may be a quadruple extended precision hexadecimal floating point number. As such, the associated circuitry may similarly scale.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The instructions disclosed herein, which may execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A floating point unit comprising:
   hexadecimal floating point normalizer circuitry configured to output a normalized hexadecimal result that includes a first segment and a second segment, including a result register sized to the normalized hexadecimal result;
   latch circuitry configured to retain the first segment of the normalized hexadecimal result as buffered data, the latch circuitry having a bit width sized to the first segment; and
   hexadecimal floating point rounder circuitry configured to output a rounded result and having an input register configured to receive the first segment and the second segment from the hexadecimal floating point normalizer circuitry and the buffered data from the latch circuitry, the input register having a bit width sized to the first segment and the second segment.

2. The floating point unit of claim 1, wherein the hexadecimal floating point normalizer circuitry further includes an input register sized to receive a first portion of a fraction of a floating point result.

3. The floating point unit of claim 2, wherein the floating point result is quadruple precision.

4. The floating point unit of claim 2, wherein the first portion includes a first half of the fraction.

5. The floating point unit of claim 4, wherein the fraction is 112 bits.

6. The floating point unit of claim 4, wherein the first portion includes a leading zero anticipator too large bit configured to denote error in an anticipated leading zero control signal associated with the hexadecimal floating point normalizer circuitry.

7. A floating point unit comprising:
   hexadecimal floating point normalizer circuitry configured to output a normalized hexadecimal result that includes a first segment and a second segment, including:
      an input register sized to receive a first portion of a fraction portion of a floating point number and a second portion of the fraction portion of the floating point number; and
      a result register sized to output the normalized hexadecimal result, the output based on the fraction portion;
   latch circuitry configured to retain the first segment associated with the first portion of the normalized hexadecimal result as buffered data,
   the latch circuitry having a bit width sized to the first segment; and
   hexadecimal floating point rounder circuitry configured to output a rounded result, including:
      an input register configured to receive the first segment and the second segment associated with the second portion of the normalized hexadecimal result from the hexadecimal floating point normalizer circuitry and the buffered data from the latch circuitry, and having a bit width sized to the first segment and the second segment.

8. The floating point unit of claim 7, wherein the first portion is a first half of the fraction portion.

* * * * *